United States Patent [19]

Parrow

[11] Patent Number: 4,858,959

[45] Date of Patent: Aug. 22, 1989

[54] FUEL LINE ADAPTOR

[76] Inventor: R. Alan Parrow, 53 Montana Dr., Holden, Mass. 01520

[21] Appl. No.: 239,434

[22] Filed: Sep. 1, 1988

[51] Int. Cl.⁴ .............................................. F16L 35/00

[52] U.S. Cl. ........................................ 285/39; 285/14; 285/93; 285/184; 285/192; 285/330; 210/532.1; 220/DIG. 6

[58] Field of Search ..................... 285/93, 13, 14, 184, 285/39, 192, 330; 137/312, 313, 314; 210/532.1, 803; 220/DIG. 6; 222/108

[56] References Cited

U.S. PATENT DOCUMENTS

| | | | |
|---|---|---|---|
| 1,063,754 | 6/1913 | Weiss | 220/DIG. 6 X |
| 2,762,511 | 9/1956 | Sternaman | 210/532.1 X |
| 3,612,577 | 10/1971 | Pope et al. | 285/14 |
| 4,682,796 | 7/1987 | Parrow et al. | 285/184 X |

FOREIGN PATENT DOCUMENTS

| | | | |
|---|---|---|---|
| 2107809 | 5/1983 | United Kingdom | 285/13 |

*Primary Examiner*—Dave W. Arola
*Attorney, Agent, or Firm*—Blodgett & Blodgett

[57] ABSTRACT

A fuel line adaptor for application to a conventional fuel tank and to the fuel line leaving from the fuel tank. The adaptor includes a housing which has a passageway that leads from the outlet opening of the fuel tank to a drain opening which is closed by a removable drain plug. A feed tube extends through the housing. One end of the feed tube extends above the sludge and water line within the tank and has an inlet opening. The outer end of the feed tube extends through the housing and is operatively connected to the fuel line. A seal is formed between the tube and the housing to prevent sludge and water from reaching the fuel line.

11 Claims, 6 Drawing Sheets

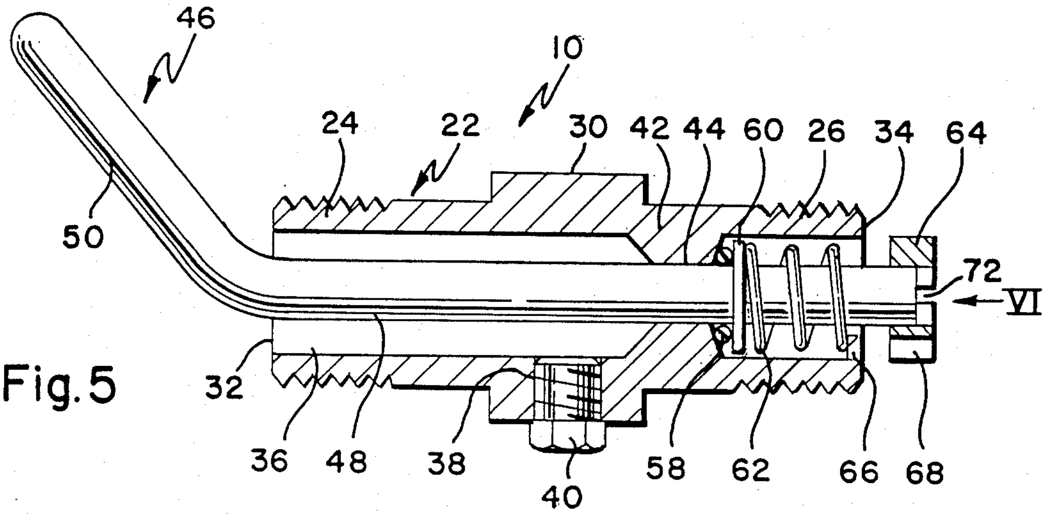
Fig.5
Fig.6
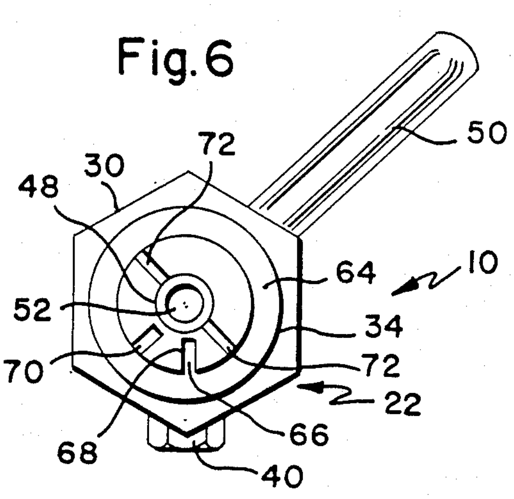
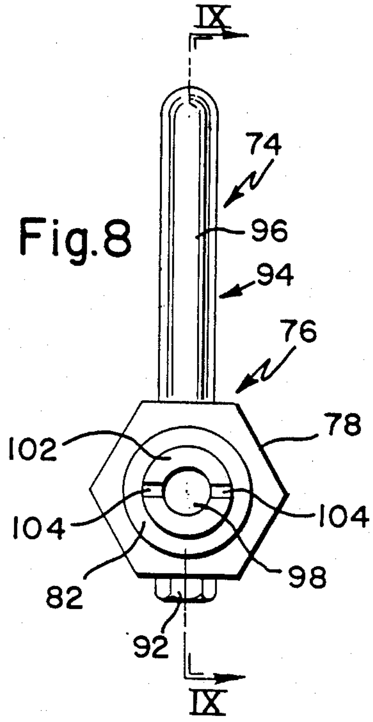
Fig.8
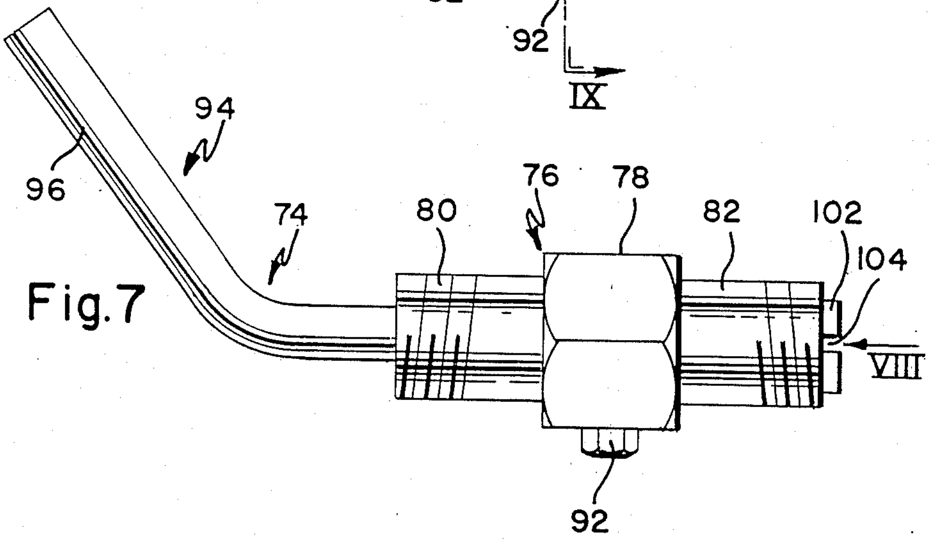
Fig.7

FUEL LINE ADAPTOR

BACKGROUND OF THE INVENTION

The present invention relates to an adaptor fixture between the outlet of a fuel tank and the feed line from the fuel tank, particularly for fuel tanks containing heating oil.

Industrial and domestic oil heating systems include a storage tank for heating oil which is operatively connected to an oil burner system by a fuel line. The fuel line is connected to an outlet opening either at the bottom wall of the tank or at a side wall of the tank near the bottom wall. After a period of time, sludge and water accumulate at the bottom of the tank. When the sludge and water level reaches the outlet opening of the tank for tanks which have a side opening, sludge and water begins to enter the fuel line. The sludge and water interferes with the efficient operation of the fuel burner and eventually leads to serious damage to various parts of the oil heating system. With respect to bottom feed tanks, water and sludge enters the fuel line essentially at the beginning of use. It is therefore necessary to employ a filter in the fuel line to remove the sludge and water before it reaches the oil burner. A filter is also used for side feed tanks when the water and sludge reaches the outlet of the tank. However, the filter becomes saturated after a relatively short period of time so that sludge and water begins to enter the fuel burner or the free flow of fuel is impaired. This requires frequent servicing of the filter equipment in order to prevent damage to elements of the burner system. Frequent service calls represents a nuisance and an expense to the consumer as well as a constant source of aggravation to the oil dealer.

A partial solution to the problem and sludge accumulation is to remove the sludge and water from the tank. Special pumping equipment is required and must be performed by professional service personal. The process is time consuming and expensive and must be performed when the oil supply in the tank is low. Further, the procedure does not always completely remove sludge and water from the tank. My prior U.S. patent, Parrow et al. No. 4,682,796 of July 28, 1987 shows a fuel line adaptor for a side feed tank which extends the effective life of the tank with respect to the problem of sludge and water buildup at the bottom of the tank. Even this solution to the sludge and oil problem does not completely eliminate the problem. Some states have mandated that sludge and water should not be allowed to accumulate in the fuel tank and have, accordingly, required that the outlet opening of the tank be located at the bottom of the tank. This also means that filters must be used with all the inherent problems associated with the use of filters. These and other difficulties experienced with the prior art fuel feeding systems from a fuel tank have been obviated by the present invention.

It is, therefore, a principle object of the invention to provide an adaptor for a fuel line from a fuel tank which prevents sludge and water from being drawn through the fuel line and which enables the water and the sludge to be drained from the tank without contaminating the fuel line.

Another object of this invention is the provision of an adaptor for the fuel line from a fuel tank which eliminates the absolute need of a fuel filter for the sludge and water from the bottom of the fuel tank.

A further object of the present invention is the provision of an adaptor for the fuel line from a fuel tank which is simple in construction, relatively inexpensive, easy to install and capable of providing a long life of useful service.

It is another object of the present invention to provide an adaptor for the fuel line from a fuel tank which has either a bottom outlet opening or a side outlet opening.

With these and other objects in view, as will be apparent to those skilled in the art, the invention resides in the combination of parts set forth in the specification and covered by the claims appended hereto.

SUMMARY OF THE INVENTION

A fuel line adaptor which includes a housing having a fixture for the outlet opening of the fuel tank and a fixture for coupling to the standard pipe fixture of the fuel line. The housing has an opening at each fixture, a bore which extends between these two openings and a drain opening which is provided with a drain fixture for selectively opening and closing the drain opening. The feed tube has an outer portion which extends into the bore from the opening in the first fixture to the second fixture and an inner portion which extends from the first fixture into the fuel tank to a point which is substantially above the outlet opening of the fuel tank. A seal is formed between the feed tube and the housing at the second fixture for preventing fuel from the fuel tank from flowing from the bore to the second opening and allowing fuel from the fuel tank to flow through the tube to the second opening of the housing.

BRIEF DESCRIPTION OF THE DRAWINGS

The character of the invention, however, may be best understood by reference to one of its structural forms, as illustrated by the accompanying drawings, in which:

FIG. 5 is a view similar to FIG. 4 showing the adaptor in its inoperative state, FIG. 6 is an end elevational view of the adaptor in its inoperative state looking in the direction of VI of FIG. 5, FIG. 7 is a side elevational view of a modified adaptor for a fuel tank having a side outlet opening, FIG. 8 is an end elevational view of the modified adaptor of FIG. 7 looking in a direction of arrow VIII of FIG. 7, FIG. 12, and FIG. 14 is a vertical cross-sectional view of the adaptor of FIG. 13 taken along the line XIV—XIV of FIG. 13.

DESCRIPTION OF THE PREFERRED EMBODIMENT

Figure 1:
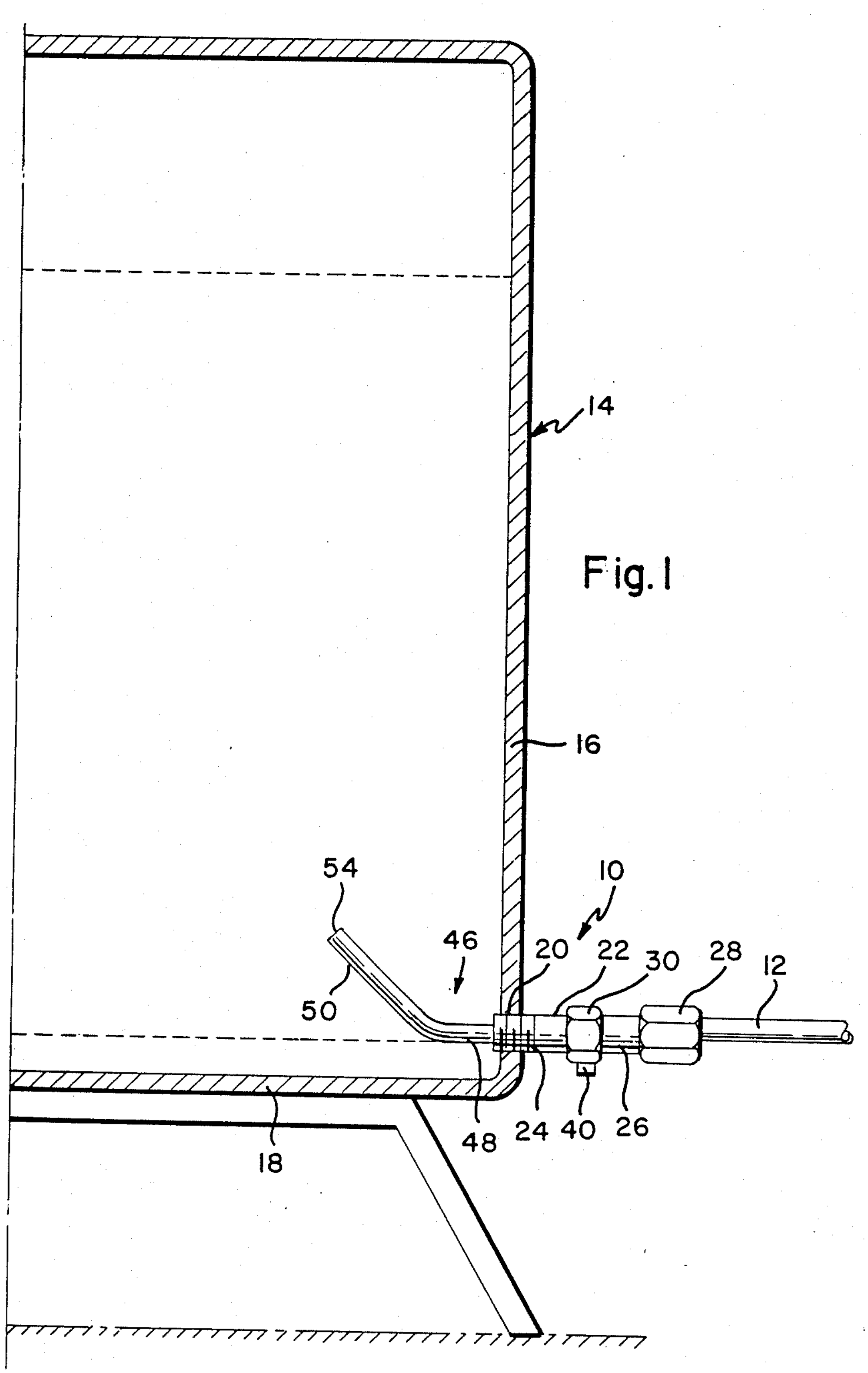
FIG. 1 a side elevational view of an adaptor embodying the principles of the present invention shown applied to a fuel tank which has a side feed outlet opening.
Figure 2:
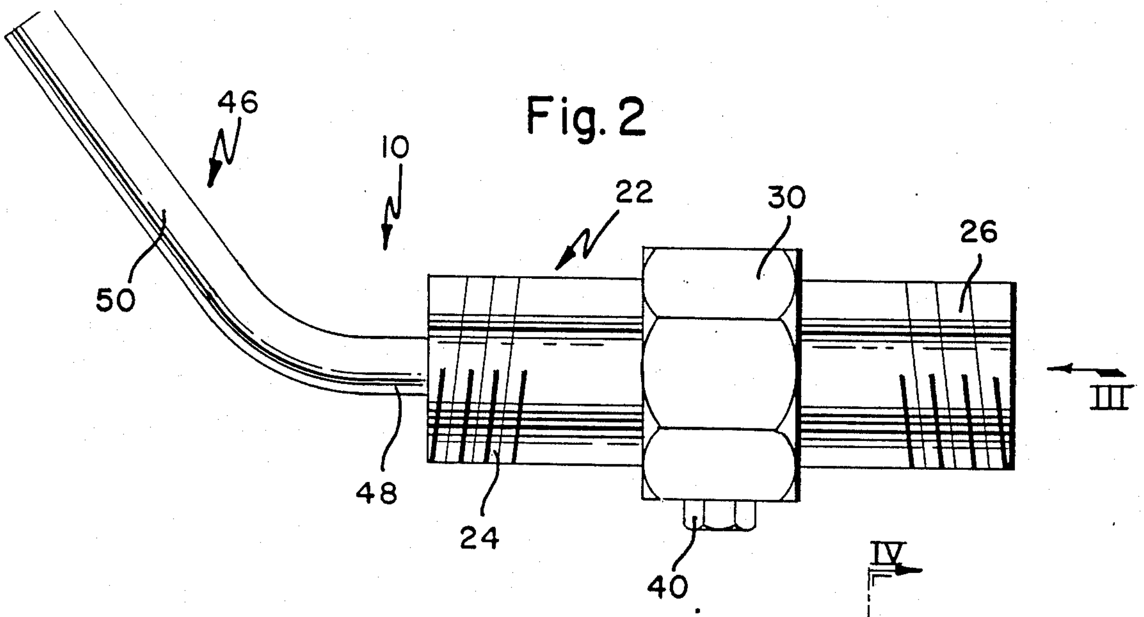
FIG. 2 is an enlarged side elevational view of the adaptor.

Referring to FIGS. 1-6, there is shown the preferred embodiment of a fuel line adaptor of the present invention for use with a fuel tank having a side outlet opening. Referring first to FIG. 1, the preferred adaptor is generally indicated by the reference numeral 10 and is shown applied to a side feed fuel tank generally indicated by the reference numeral 14 and to a fuel line 12. The fuel tank 14 comprises a side wall 16 and a bottom wall 18. The side wall 16 has a threaded outlet opening 20 near the bottom wall 18. Referring also to FIGS. 2-6, the adaptor 10 comprises a housing which is generally indicated by the reference numeral 22 and a feed tube which is generally indicated by the reference numeral 46. The housing 22 comprises a first threaded end fixture 24, a second threaded end fixture 26 and a hexagonal outer surface 30 between the fixtures 24 and 26. The housing 22 has a first opening 32 at the fixture 24, a second opening 34 at the fixture 26 and a bore 36 which extends from the opening 32 to the opening 34. The housing 22 also has a drain opening between the fixtures 24 and 26 which extends from the bore 36 to outside of the housing. The drain opening 38 is threaded for receiving a threaded drain plug 40. A restricter flange 42 is located between the drain opening 38 and the second opening 34 and defines a circular restricted opening 44.

Figure 4:
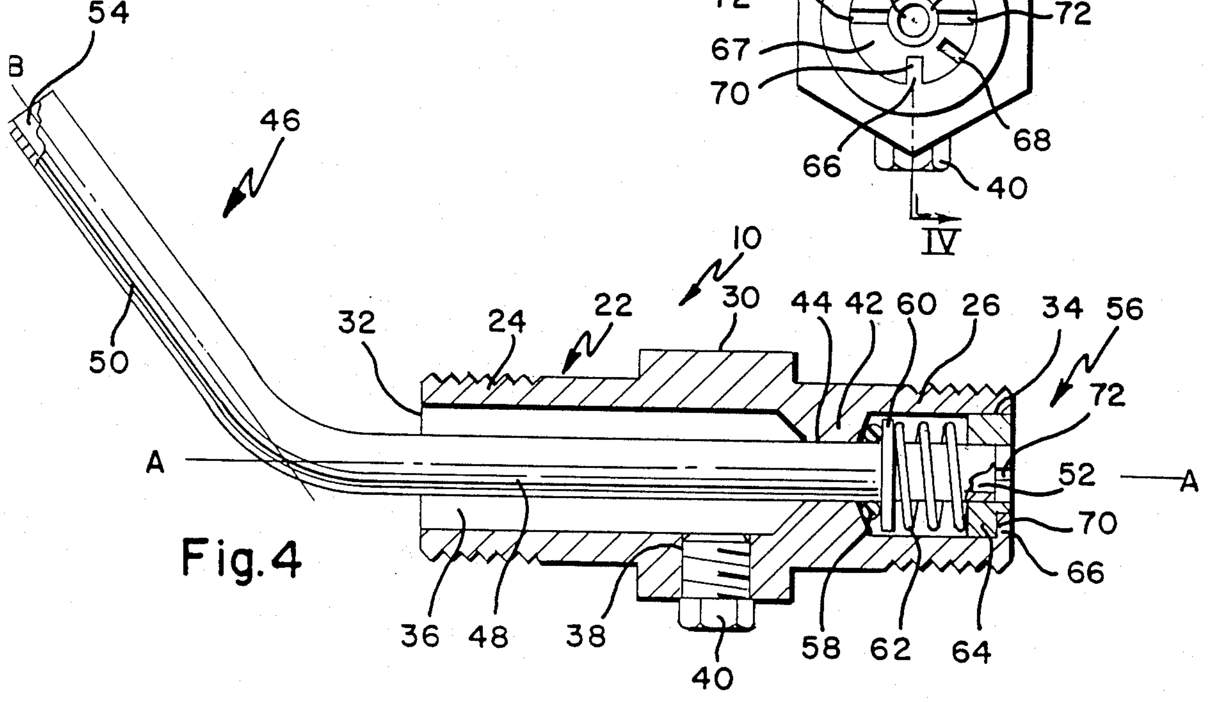
FIG. 4 is a vertical cross-sectional view of the adaptor taken along the line IV—IV of FIG. 3, showing the adaptor in its operative state.

The feed tube 46 comprises an outer portion 48 which is located within the bore 36 and an inner portion 50 which is located outside of the housing 22. The outer portion 48 has a central longitudinal axis A—A and the inner portion 50 has a central longitudinal axis B—B which is at an angle to the axis A—A as shown in FIG. 4. The terminal end of the outer portion 48 of the tube has an outlet opening 52. The terminal end of the inner portion 50 of the feed tube has an inlet opening 54.

The portion of the bore 36 which extends from the restricter flange 42 to the second opening 34 is cylindrical and contains a locating and sealing means generally indicated by the reference number 56. The locating and sealing means 56 comprises a circular washer 60 about the feed tube 46 and an elastomeric O-ring about the feed tube 46 between the washer 60 and the restricter flange 42. The disc 64 is fixed to the outer end of the feed tube 46 and is held at the second opening 34 within the bore 36 by means of a tab 66 which extends from the fixture 26 into the bore 36. A helical spring 62 is mounted on the outer portion 48 of the feed tube between the disc 64 and the washer 60 for biasing the washer 60 against the 0-ring 58 and, thereby, forming a seal at the restricted opening 44. Fuel oil from the tank 14 is free to enter the bore 36 up to the restricter flange 42 but is prevented from reaching the portion of the bore 36 on the opposite side of the restrictive flange 42 by the locating and sealing means 56. However, water and sludge from the bottom of the tank 14 can be drained from the bore 36 through the drain opening 38 by removing the drain plug 40.

Figure 3:
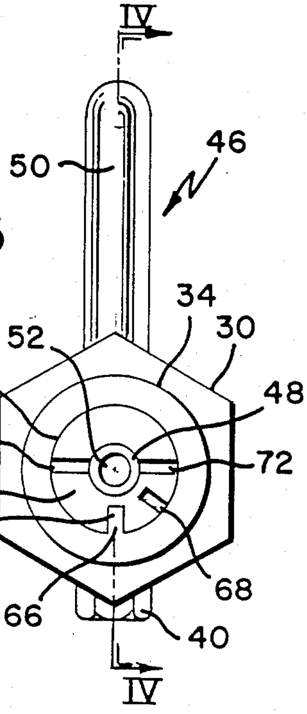
FIG. 3 is an end elevational view of the adaptor looking in the direction of arrow III of FIG. 2.

Referring particularly to FIGS. 3 and 6, the disc 64 has a slot 68 at its outer edge and a notch 66 at its outer face surface 67. The face surface 67 also has a pair of diametrically opposed locating slots 72. The disc 64 is in its operative position as shown in FIG. 4. The tab 66 is located within the notch 70. This prevents the disc 64 from moving axially along the axis A-A and for rotating about the axis A—A. The disc 64 is removed from its operative position as shown in FIG. 4 to its inoperative position as shown in FIG. 5 by inserting the blade of a screwdriver into the slots 72 and pushing the disc 64 against the spring 62 until the notch 70 is clear of the tab 66. The disc 64 is then rotated by the screwdriver about the axis A—A to bring the slot 68 into alignment with the tab 66. The blade of the screwdriver is removed from the slots 72 to allow the spring 62 to push the disc 64 out of the second opening 34. There is sufficient clearance between the tab 66 and the sides of the slots 68 to enable the disc 64 to pass freely by the tabs 66.

The adaptor 10 is applied to the tank 14 in the fuel line 12 when the disc 64 is in its inoperative position as shown in FIG. 5. The inner portion 50 of the feed tube is inserted through the outlet opening 20 of the tank and the fixture 24 of the housing is threaded into the opening 20 while holding the feed tube 46 stationary. The housing is rotated about the axis A—A by applying a hex wrench to the hexagonal surface 30. Even if the feed tube 46 is not held it is prevented from rotating with the housing 22 because of the angled inner portion 50 of the feed tube. The angle of the inner portion 50 with respect to the axis A—A is such that the inner portion 50 will strike the bottom 18 of the tank 14 if the tube is rotated about the axis A—A. The fixture 24 is threaded into the outlet opening 20 so that the drain plug 40 occupies a bottom position as shown in FIGS. 1-6. A screwdriver is then applied to the slots 72 for rotating the disc 64 to the position as shown in FIG. 6, wherein the slot 68 is aligned with the tab 66. The disc 64 is pushed into the bore 36 through the second opening 34 by the screwdriver so that the slot 68 passes along the tab 66 until the disc 64 is inside of the tab 66. The disc 64 is again rotated by the screwdriver from the position shown in FIG. 6 until the notch 70 is aligned with the tab 66 as shown in FIG. 3. The screwdriver is then removed and the spring 62 pushes the disk 64 outwardly so that the tab 66 enters the notch 70 as shown in FIG. 4. This orients the inlet opening 54 of the feed tube to its highest position within the fuel tank 14. The inner portion 50 of the feed tube is in its highest position as shown in FIGS. 1-4. The inner portion 50 of the feed tube, the tab 66 and the drain plug 40 all lie within the same vertical plane as can be seen most clearly in FIG. 3. The drain plug 40, the tab 66, and the notch 70, thereby, functions as locating means for positioning the inner portion 50 of the feed tube to its optimum position within the tank 14. When the adaptor 10 is properly positioned as shown in FIG. 1, the adaptor is operatively connected to the fuel line 12 by means of the connecting fixture 28.

Referring to FIGS. 7-10, there is shown a first modified adaptor, generally indicated by the reference numeral 74 for use for a side feed tank, such as the tank 14 shown in FIG. 1. The adaptor 74 comprises a housing which is generally indicated by the reference numeral 76 and a feed tube which is generally indicated by the reference numeral 94. The housing 76 comprises a first threaded fixture 80 at one end of the housing and a second threaded fixture 82 at the opposite end of the housing. A hexagonal outer surface 78 is located between the fixtures 80 and 82 to enable the housing 74 to be rotated by means of a hexagonal wrench. A first opening 84 is located at the first fixture 80 and a second opening 86 is located at the second fixture 82. A cylindrical bore 88 extends from the opening 84 to the opening 86. A threaded drain opening 90 extends from the bore 88 through the hexagonal surface 78. A drain plug 92 is threaded into the opening 90.

Figure 9:
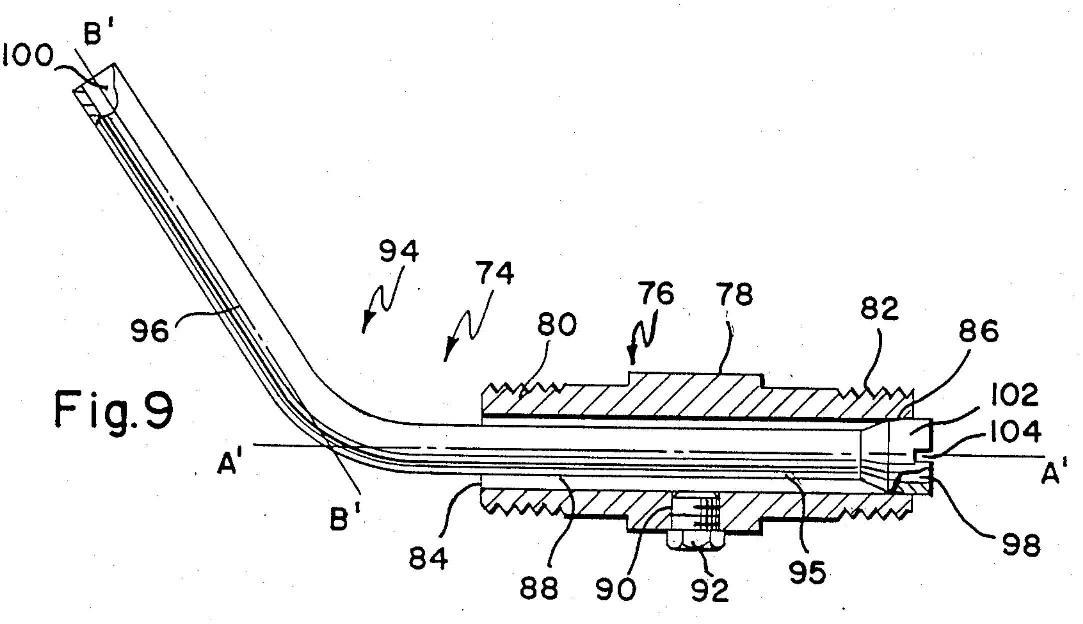
FIG. 9 is an vertical cross-sectional view of the modified adaptor taken along the line IX—IX of FIG. 8, showing the adaptor in its operative state.
Figure 10:
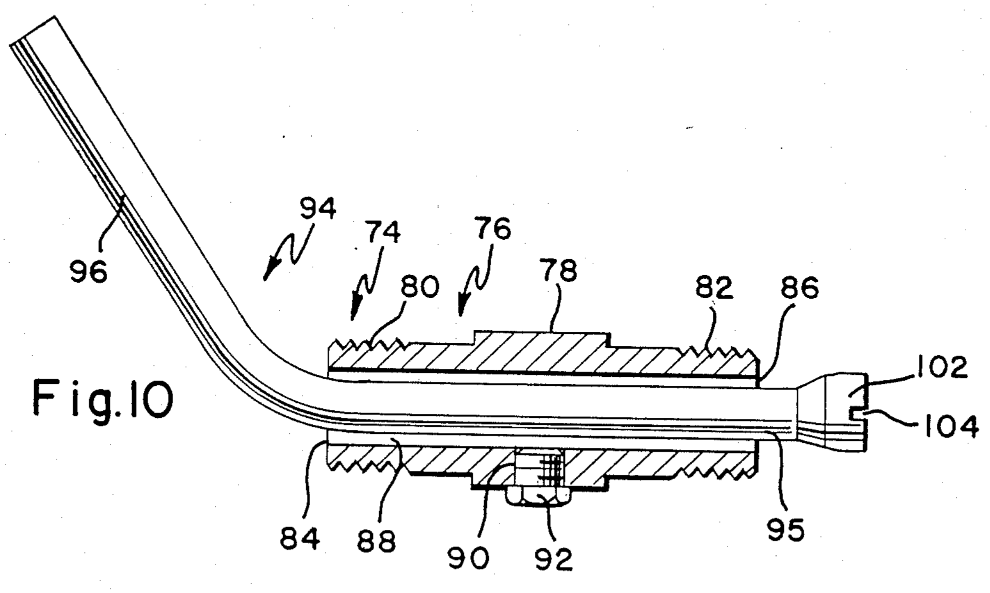
FIG. 10 is a view similar to FIG. 9 showing the modified adaptor in its inoperative state.

The feed tube 94 comprises an outer portion 95 which is located within the bore 88 and an inner portion 96 which is outside of the housing 76. The outer portion 95 of the feed tube has a central longitudinal axis A'—A'. The inner portion 96 of the feed tube has a central longitudinal axis B'—B' which is at a substantial angle to the axis A'—A' as shown in FIG. 9. The terminal end of the inner portion 96 has an inlet opening 100 and the terminal end of the outer portion 95 of the feed tube has an outlet opening 98. The terminal end of the portion 95 of the feed tube has a valve enlargement 102 which is provided with a pair of slots 104. The valve enlargement 102 forms a seal at the opening 86 when the enlargement is inserted into the opening 86 to the extent shown in FIG. 9. Fuel oil from the fuel tank is free to flow through the feed tube 96 from the inlet opening 100 through the outlet opening 98. If it becomes necessary to remove sludge and water from the bottom of the tank, the drain plug 92 is removed from the drain opening 90. The sludge and water from the bottom of the tank passes into the bore 88 and through the drain opening 90. The sludge and water is prevented from passing into the fuel line 12 because of the seal which is created by the valve enlargement 102 at the second opening 86.

Figure 11:
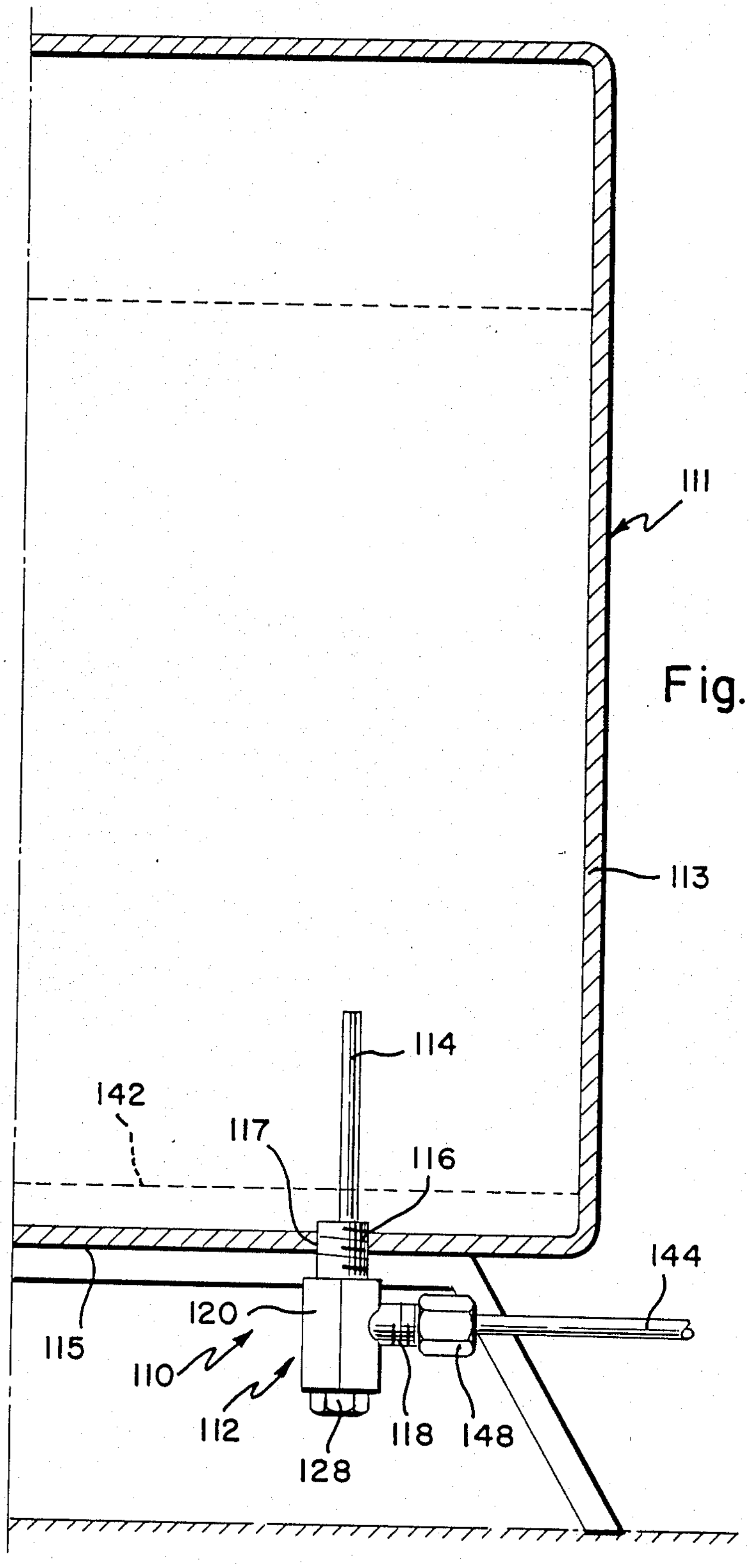
FIG. 11 is a side elevational view of an adaptor embodying the principles of the present invention shown applied to a fuel tank having a bottom outlet opening.
Figure 12:
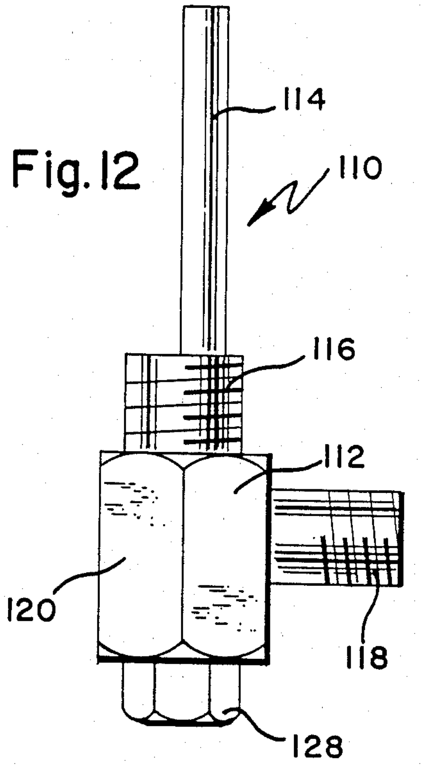
FIG. 12 is an enlarged side elevational view of the adaptor of FIG. 11.
Figure 14:
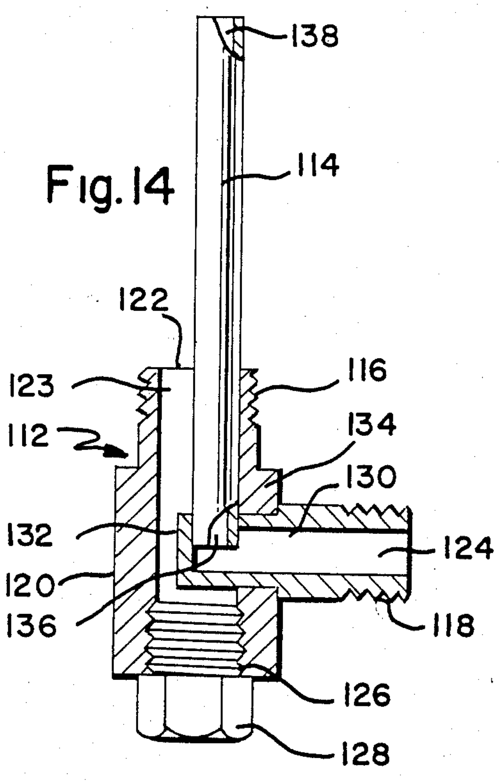
Figure 13:
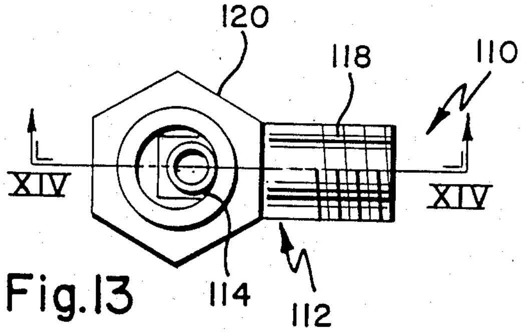
FIG. 13 is a top plan view of the adaptor of FIG.

Referring to FIGS. 11-14, there is shown a second modified fuel line adaptor which is generally indicated by the reference numeral 140 which is adapted for application to a bottom feed tank. The adaptor 110 is shown in FIG. 11 applied to a bottom feed tank which is generally indicated by the reference numeral 111. The tank 111 includes a side wall 113 and a bottom wall 115 which has a threaded outlet opening 117. The adaptor 110 comprises a housing which is generally indicated by the reference numeral 112 and a feed tube 114. The housing 112 comprises a first threaded fixture 116, a second threaded fixture 118, and a hexagonal outer surface 120. The housing 112 has a first opening 122 at the first fixture 116 and a second opening 124 at the second fixture 118. The housing 112 also has a threaded drain opening 126 which is closed by a threaded drain plug 128. A vertical bore 123 extends from the first opening 122 to the drain opening 126. A horizontal bore 130 extends from the second opening 124 into the vertical bore 123. However, the bore 130 is separated from the bore 123 by means of an end cap 132. The end cap 132 has an upper aperture 134 which receives the bottom end of the feed tube 114. The bottom end of the tube 114 is fixed in the aperture 134 so that a seal is formed between the bores 130 and 123. The upper end of the feed tube 114 has an inlet opening 138 and the bottom end of the feed tube has a outlet opening 136 which lies within the horizontal bore 130.

The adaptor 110 is applied to the fuel tank by threading the first fixture 116 into the outlet opening 117 at the bottom 115 of the fuel tank. When the adaptor 110 is applied to the tank as shown in FIG. 11, the top of the feed tube 114 extends substantially above the bottom wall of the tank and well above the sludge and water level which is indicated by the reference numeral 142. Uncontaminated fuel oil is thereby drawn into the inlet opening 138 at the top of the tube and flows into the horizontal bore 130 from the outlet opening 136 of the tube and then to the fuel line 144 which feeds fuel oil to the oil burner. Sludge and water are free to enter the bore 123 and are prevented from entering the bore 130 because of the cap 132 and the seal which is formed by the feed tube 114 at the aperture 134. The sludge and water can be drained from the bottom of the fuel tank 111 by removing the drain plug 128 from the drain opening 126.

It is obvious that minor changes may be made in the form and construction of the invention without departing from the material spirit thereof. It is not, however, desired to confine the invention to the exact form herein shown and described but it is desired to include all such as properly come within the scope claimed.

The invention having been thus described, what is claimed as new and desired to be secured by Letters Patent is:

1. A fuel line adaptor for a fuel line having a standard pipe fixture and a fuel tank having an outlet opening, said adaptor comprising:

(a) a housing having a first fixture for operative connection to said outlet opening, a second fixture for operative connection to said standard pipe fixture, a first opening at said first fixture, a second opening at said second fixture, a drain opening, and a bore which extends from said first opening to said drain opening, (b) a drain fixture at said drain opening for selectively opening and closing said drain opening, (c) a feed tube which has an outer portion which extends into said bore from said first opening to said second fixture, said outer portion having an outlet opening which is operatively connected to said second opening, said feed tube having an inner portion which extends from said first opening into said fuel tank, said inner portion having an inlet opening which is substantially above the outlet opening of the tank, and (d) sealing means for forming a seal between said feed tube and said housing at said second fixture for preventing fuel from said fuel tank from flowing from said bore to said second opening and allowing fuel from said fuel to said second opening.

2. A fuel line adaptor as recited in claim 1, wherein the fuel tank has a bottom wall and the outlet opening is in the bottom wall, and wherein said bore and said feed tube each have a central longitudinal axis which is vertical when said first fixture is connected to said outlet opening and said second fixture has a central longitudinal axis which is horizontal.

3. A fuel line adaptor as recited in claim 2, wherein said second fixture comprises an outer threaded end which extends beyond said housing, an outer opening at said threaded end, an inner end which extends into the bore of said housing, an inner opening at said inner end and a horizontal bore which extends from said inner opening to said outer opening and, wherein the outer end of said feed tube is operatively connected to the inner end of said second fixture so that said inner opening is operatively connected to the outlet opening of said feed tube.

4. A fuel line adaptor as recited in claim 3, wherein the outer end of said feed tube extends through the inner opening of said second fixture and into said horizontal bore.

5. A fuel line adaptor for a fuel line having a standard pipe fixture and a fuel tank having a bottom wall, a front wall and a threaded outlet opening in the front wall adjacent the bottom wall, said adaptor comprising:

(a) a housing having a first threaded end fixture for threading into said outlet opening, a second threaded end fixture for connection to said standard pipe fixture, a first opening at said first threaded end fixture, a second opening at said second threaded fixture end, a horizontal bore which extends from said first opening to said second opening and a drain opening to said bore between said first and second openings, (b) a drain fixture at said drain opening for selectively opening and closing said drain opening, (c) a feed tube which has an outer portion, an outlet opening at the terminal end of said outer portion, an inner portion, an inlet opening at the terminal end of said inner portion, said outer portion extending through said bore and having an outer central axis and being rotatable about said axis relative to said housing, said tube being smaller in cross-section than said bore at least from said outlet opening to said drain opening so that there is a space between said outlet opening to said drain opening, said inner portion extending into said fuel tank from said second end and having an inner central axis which is at an angle to said outer central axis so that said inlet opening is located at a substantial distance above the outlet opening of the tank when said outer end is rotated so that said inner central axis extends at an upward angle to said outer central axis, and (d) sealing means for forming a seal between said feed tube and said housing at a point between said drain opening and said second opening for preventing fuel from said fuel tank from flowing out of said second opening except through the outlet opening of said feed tube.

6. A fuel line adaptor as recited in claim 5, wherein the outer end of said feed tube has a lot for receiving the blade of a screwdriver for rotating said feed tube about said outer central axis and for functioning as an indicating means for the orientation of said inner central axis relative to said outer central axis.

7. A fuel line adaptor as recited in claim 5, wherein said sealing means comprises a circular valve enlargement at the outer end of said feed tube and a circular valve seat at said second opening which forms a seal with said valve enlargement.

8. A fuel line adaptor as recited in claim 7, wherein the outer portion of said feed tube is cylindrical and wherein said sealing means comprises:

(a) a restrictor flange within said bore which defines a circular restricted opening between the first and second opening of said housing, the outer portion of said feed tube extending through said restricted opening, (b) an elastomeric sealing ring around the outer portion of said feed tube at said restricted opening between said flange and said second opening for forming a seal between the outer portion of said tube and said flange, and (c) biasing means for biasing said sealing ring against said flange.

9. A fuel line adaptor as recited in claim 8, wherein said biasing means comprises:

(a) a washer between said sealing ring and said second opening, (b) a stop at said second opening, and (c) a spring between said step and said washer for biasing said washer against said sealing ring.

10. A fuel line adaptor as recited in claim 9, wherein said bore is cylindrical between said flange and said second opening and wherein said stop comprises:

(a) a tab which projects into said bore at said second opening, (b) locating disc which is fixed to the outer end of the outer portion of said feed tube, said locating disc having a slot in its outer periphery which is sufficiently shaped and of sufficient size to receive said tab and allow said disc to move into and out of said second opening along said outer central axis when said slot is in axial alignment with said tab, said locating disc having an outer face surface which faces away from said housing and which has a notch at the outer edge of said face surface, said notch being shaped so as to receive said tab when said disc is located within said bore between said tab and said flange to prevent said feed tube from rotating about said outer central axis, the inner end of the inner portion of said feed tube being substantially above the outlet opening of said fuel tank when said tab is located within said notch, said housing being free to rotate about said outer central axis relative to said feed tube when said locating disc is outside of said second opening.

11. A fuel line adaptor as recited in claim 10, wherein the outer end of said feed tube has a slot for receiving the blade of a screwdriver for rotating said feed tube about said outer central axis.

* * * * *